(12) United States Patent
Arnone et al.

(10) Patent No.: US 11,493,432 B2
(45) Date of Patent: *Nov. 8, 2022

(54) FLOW CELL FOR DIRECT ABSORPTION SPECTROSCOPY

(71) Applicant: DAYLIGHT SOLUTIONS, INC., San Diego, CA (US)

(72) Inventors: David F. Arnone, Mountain View, CA (US); Miles James Weida, Poway, CA (US)

(73) Assignee: DAYLIGHT SOLUTIONS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,221

(22) Filed: Jul. 27, 2020

(65) Prior Publication Data

US 2021/0041351 A1    Feb. 11, 2021

Related U.S. Application Data

(63) Continuation of application No. 16/100,762, filed on Aug. 10, 2018, now Pat. No. 10,753,856.

(Continued)

(51) Int. Cl.
*G01N 21/05* (2006.01)
*G01N 30/72* (2006.01)
(Continued)

(52) U.S. Cl.
CPC ........... *G01N 21/05* (2013.01); *G01N 21/031* (2013.01); *G01N 30/7233* (2013.01); *G01N 30/74* (2013.01); *G01N 21/0303* (2013.01); *G01N 21/3577* (2013.01); *G01N 2021/036* (2013.01); *G01N 2021/0364* (2013.01);
(Continued)

(58) Field of Classification Search
CPC ..... G01N 2021/036; G01N 2021/0364; G01N 2021/0389; G01N 2021/399; G01N 2030/027; G01N 21/0303; G01N 21/031; G01N 21/05; G01N 21/3577; G01N 30/7233; G01N 30/74
See application file for complete search history.

(56) References Cited

U.S. PATENT DOCUMENTS

2,810,835 A    10/1957  Miller
2014/0373606 A1  12/2014  Kraiczek et al.
(Continued)

*Primary Examiner* — Michael A Lyons
*Assistant Examiner* — Amanda Merlino
(74) *Attorney, Agent, or Firm* — Roeder & Broder LLP; Steven G. Roeder (57) ABSTRACT

A flow cell assembly (16) for a fluid analyzer (14) that analyzes a sample (12) includes (i) a base (350) that includes a base window (350B); (ii) a cap (352) having a cap window (352B) that is spaced apart from the base window (350B); and (iii) a gasket (360) that is secured to and positioned between the base (350) and the cap (352), the gasket (360) having a gasket body (360A) that includes a gasket opening (360B). The gasket body (360A), the base (350) and the cap (352) cooperate to define a flow cell chamber (362). Moreover, an inlet passageway (366) extends into the flow cell chamber (362) to direct the sample (12) into the flow cell chamber (362); and an outlet passageway (368) extends into the flow cell chamber (362) to allow the sample (12) to exit the flow cell chamber (362).

20 Claims, 10 Drawing Sheets

Related U.S. Application Data

(60) Provisional application No. 62/546,991, filed on Aug. 17, 2017.

(51) Int. Cl.
| | | |
|---|---|---|
| *G01N 21/03* | (2006.01) | |
| *G01N 21/3577* | (2014.01) | |
| *G01N 30/74* | (2006.01) | |
| G01N 30/02 | (2006.01) | |
| G01N 21/39 | (2006.01) | |

(52) U.S. Cl.
CPC ............... *G01N 2021/0389* (2013.01); *G01N 2021/399* (2013.01); *G01N 2030/027* (2013.01)

(56) References Cited

U.S. PATENT DOCUMENTS

| | | | |
|---|---|---|---|
| 2015/0276588 A1* | 10/2015 | Marshall | ................ G01N 21/05 250/343 |
| 2016/0018326 A1 | 1/2016 | Jeanotte et al. | |
| 2017/0285057 A1 | 10/2017 | Andersen | |

\* cited by examiner

FLOW CELL FOR DIRECT ABSORPTION SPECTROSCOPY

RELATED APPLICATION

This application is a continuation application of U.S. patent application Ser. No. 16/100,762 filed on Aug. 10, 2018, and entitled "FLOW CELL FOR DIRECT ABSORPTION SPECTROSCOPY". As far as permitted, the contents of U.S. Provisional application Ser. No. 16/100,762 are incorporated herein.

U.S. patent application Ser. No. 16/100,762 claims priority on U.S. Provisional Application No. 62/546,991 filed on Aug. 17, 2017, and entitled "FLOW CELL FOR DIRECT ABSORPTION SPECTROSCOPY". As far as permitted, the contents of U.S. Provisional Application No. 62/546,991 are incorporated herein.

BACKGROUND

Infrared spectroscopy of liquids is useful for characterizing liquid components. Different liquid or dissolved chemicals have strong identifying absorption features in the infrared wavelengths.

Traditionally, Fourier transform infrared (FTIR) spectrometers have been used for liquid characterization. However, liquids present unique challenges for FTIR spectroscopy. First, most liquids have strong background absorptions. Because the optical powers per wavelength available for FTIR spectrometers are quite low due to the use of broadband globar incandescent source, the path lengths through liquids that can be probed are quite small before the probe light is attenuated to unacceptably low values. Hence, FTIR is typically used to determine percent level fractions of components in liquids, and not trace additions (less than one part per thousand) to liquids that would require longer liquid path lengths for adequate sensitivity. Also, this has pushed FTIR spectroscopy to use attenuated total reflectance (ATR) interfaces. These interfaces typically result in smaller path lengths, and have the problem that they distort the spectral signatures of the chemicals being probed due to a combined effect of absorption and changing refractive index on the signal. They are therefore not well suited to quantitative liquid spectroscopy, or trace detection.

Alternatively, transmission liquid spectroscopy through a flow cell is another technique for quantitative liquid spectroscopy and trace detection. Unfortunately, existing flow cells and existing transmission liquid spectroscopy systems are not adequate.

SUMMARY

The present invention is directed to a flow cell assembly for a fluid analyzer that analyzes a sample. In one embodiment, the flow cell includes (i) a base that includes a base window; (ii) a cap that is secured to the base, the cap includes a cap window that is spaced apart from the base window; and (iii) a gasket that is secured to and positioned between the base and the cap, the gasket including a gasket body that includes a gasket opening. In this embodiment, the gasket body, the base and the cap cooperate to define a flow cell chamber. Further, the base window and the cap window define a portion of the flow cell chamber. Moreover, an inlet passageway extends through one of the base and cap into the flow cell chamber to direct the sample into the flow cell chamber; and an outlet passageway extends through one of the base and cap into the flow cell chamber to allow the sample to exit the cell chamber.

The base includes a base aperture that is aligned with the base window, and the cap includes a cap aperture that is aligned with the cap window. Further, the base window and the cap window are aligned along a window axis.

The gasket has a gasket thickness and in certain embodiments, the gasket thickness defines a path length of the flow cell chamber between the windows. With this design, the gasket thickness can be changed to change the path length. Further, the gasket opening of the gasket can be changed to adjust a cell cross-sectional area of the flow cell chamber, and a volume of the flow cell chamber. As a non-exclusive example, the flow cell chamber can have a volume of less than one micro-liter. Additionally, or alternatively, the flow cell chamber can have a cell cross-sectional area that is approximately equal to an inlet cross-sectional area of the inlet passageway, and an outlet cross-sectional area of the outlet passageway.

Additionally, the flow cell assembly can include a fastener assembly that selectively attaches the cap to the base with the gasket therebetween.

The present invention is also directed to a fluid analyzer that includes the flow cell assembly described above, a laser light source that directs a focused laser beam through one of the windows into the sample in the flow cell chamber, and an optical detector assembly that receives the beam that passes through the sample.

Moreover, the present invention is directed to a system that includes the fluid analyzer, and a pump that moves the sample through the flow cell chamber.

The present invention is also directed to a method for analyzing a sample including (i) providing a base that includes a base window; (ii) providing a cap that includes a cap window that is spaced apart from the base window; (iii) providing a gasket that includes a gasket body having a gasket opening; (iv) securing the base to the cap with the gasket therebetween; wherein the gasket body, the base and the cap cooperate to define a flow cell chamber; and wherein the base window and the cap window define a portion of the flow cell chamber; and (v) directing the sample into the flow cell chamber.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
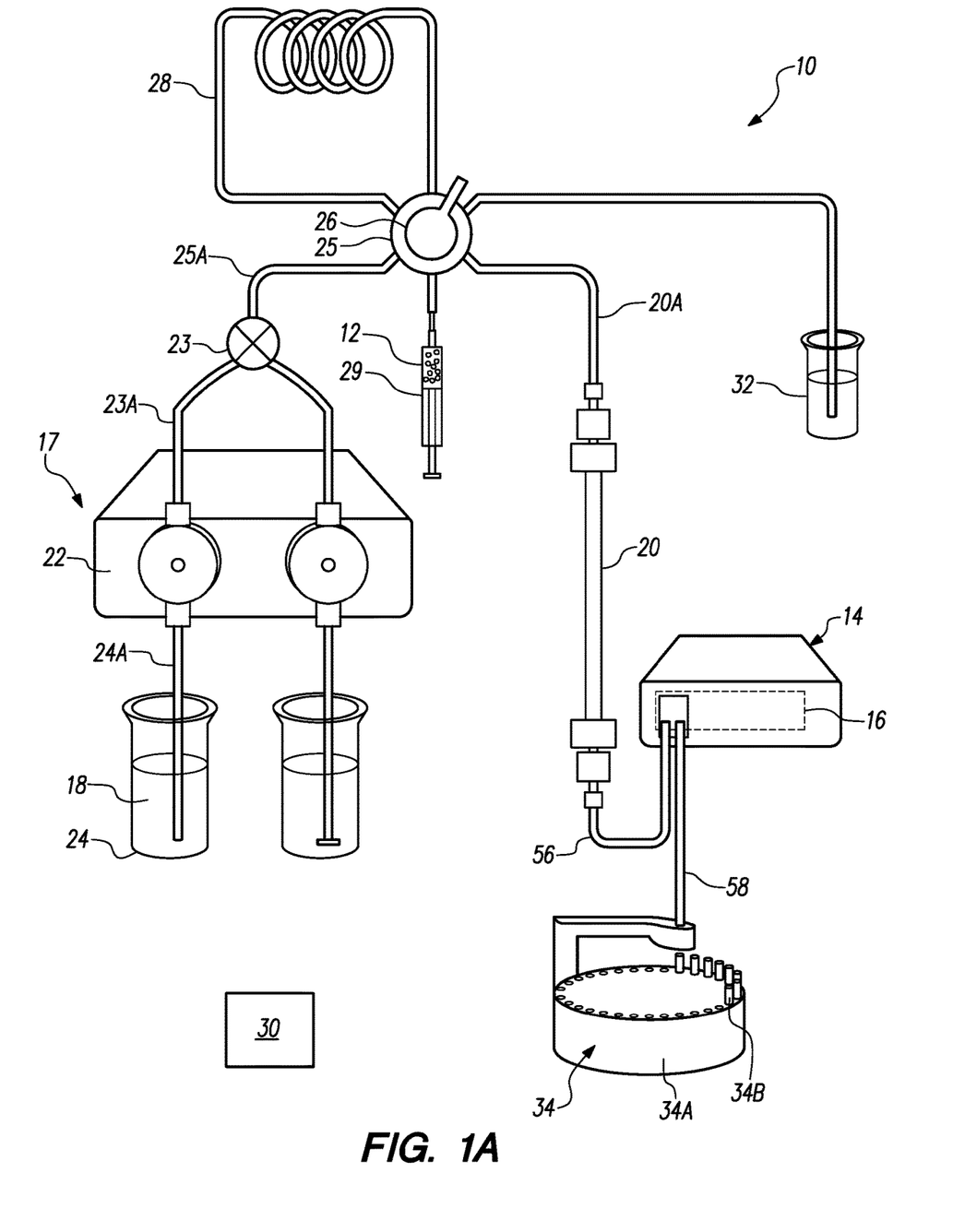
FIG. 1A is a simplified schematic illustration of a liquid chromatography and spectroscopy system having features of the present invention.

FIG. 1A is simplified illustration of a non-exclusive example of a liquid chromatography and spectroscopy system 10 having features of the present invention. In one, non-exclusive embodiment, the liquid chromatography and spectroscopy system 10 is a direct absorption spectroscopy system, e.g. a high performance liquid chromatography (HPLC) system that utilizes liquid separation to analyze a sample 12 (illustrated with small circles in FIG. 1A).

In the non-exclusive embodiment illustrated in FIG. 1A, the liquid chromatography and spectroscopy system 10 includes (i) a fluid analyzer 14 having a flow cell assembly 16 (illustrated as a box), (ii) a solvent supply 17 that provides one or more solvents 18 (two different solvents 18 are illustrated in FIG. 1A), (iii) a separation column 20, (iv) an injector assembly 25 that includes an injector valve 26, a sample loop 28, and an injector port 29, (v) a control and analysis system 30, (vi) a waste collection assembly 32, and (vii) a fraction collector assembly 34. It should be noted that the number of components and/or the positioning of the components in the spectroscopy system 10 can be different than that illustrated in FIG. 1A.

As an overview, as provided herein, the liquid, flow cell assembly 16 of the fluid analyzer 14 is uniquely designed to allow the sample 12 to be spectrally analyzed with improved accuracy. This allows the components of the sample 12 to be identified with improved accuracy. Further, the flow cell assembly 16 is relatively easy to manufacture and utilize.

The type of sample 12 that is spectrally analyzed can vary. As non-exclusive examples, the sample 12 can be a liquid, a complex mixture of multiple liquids, or a complex mixture of liquids, dissolved chemicals, and/or solids.

In the embodiment illustrated in FIG. 1A, the liquid chromatography and spectroscopy system 10 works by flowing one or more liquid solvents 18 and the sample 12 through the separation column 20 and into the fluid analyzer 14. The flow of the liquid solvent 18 and the sample 12 through the separation column 20 can be substantially constant.

In one embodiment, the solvent supply 17 includes a fluid pump assembly 22, a mixer 23 that mixes the solvents 18, and one or more reservoirs 24 (two are illustrated in FIG. 1A). In this embodiment, the fluid pump assembly 22 pumps the one or more solvents 18 from the one or more reservoirs 24, through the mixer 23, into the injector assembly 25, through the separation column 20, into the flow cell assembly 16 of the fluid analyzer 14, and finally to the fraction collector 34. The fluid pump assembly 22 can include one or more pumps.

Further, the fluid pump assembly 22 can direct the sample 12 and solvent 18 at a substantially constant rate through the flow cell assembly 16 to analyze the sample 12 relatively quickly. As alternative, non-exclusive examples, the fluid pump assembly 22 can direct the sample 12 and solvent 18 at a flow rate of approximately 0.1 mL/min, 0.2 mL/min, 0.5 mL/min, 0.7 mL/min, 1.0 mL/min, 2.0 mL/min, or 5.0 mL/min through the flow cell assembly 16.

In FIG. 1A, the fluid pump assembly 22 is located near the solvent reservoirs 24. Alternatively, the fluid pump assembly 22 can include one or more pumps located a different positions along the flow path. Further, the fluid pump assembly 22 can direct the sample 12 and solvent 18 at a variable flow rate through the flow cell assembly 15, under the control of the control and analysis system 30.

The type of solvents 18 utilized can be varied according to the type of sample 12. As non-exclusive examples, suitable solvents 18 include water, phosphate-buffered saline (PBS), dimethyl sulfoxide (DMSO), isopropyl alcohol, methyl alcohol, toluene, or tetrahydrofuran (THF).

In the non-exclusive embodiment illustrated in FIG. 1A, the sample 12 to analyze is introduced into the injection valve 26 at the injector port 29. The injection valve 26 is then actuated to force the solvent 18 flow path through the injection loop 28 before heading to the separation column 20. As non-exclusive examples, the injection loop can have a volume of 5 µL, 10 µL, 20 µL, 50 µL, 75 µL, or 100 µL. When the sample 12 reaches the separation column 20, it is separated into different components based on physical properties of the sample mixture 12 (e.g. size or mobility).

Figure 1B:
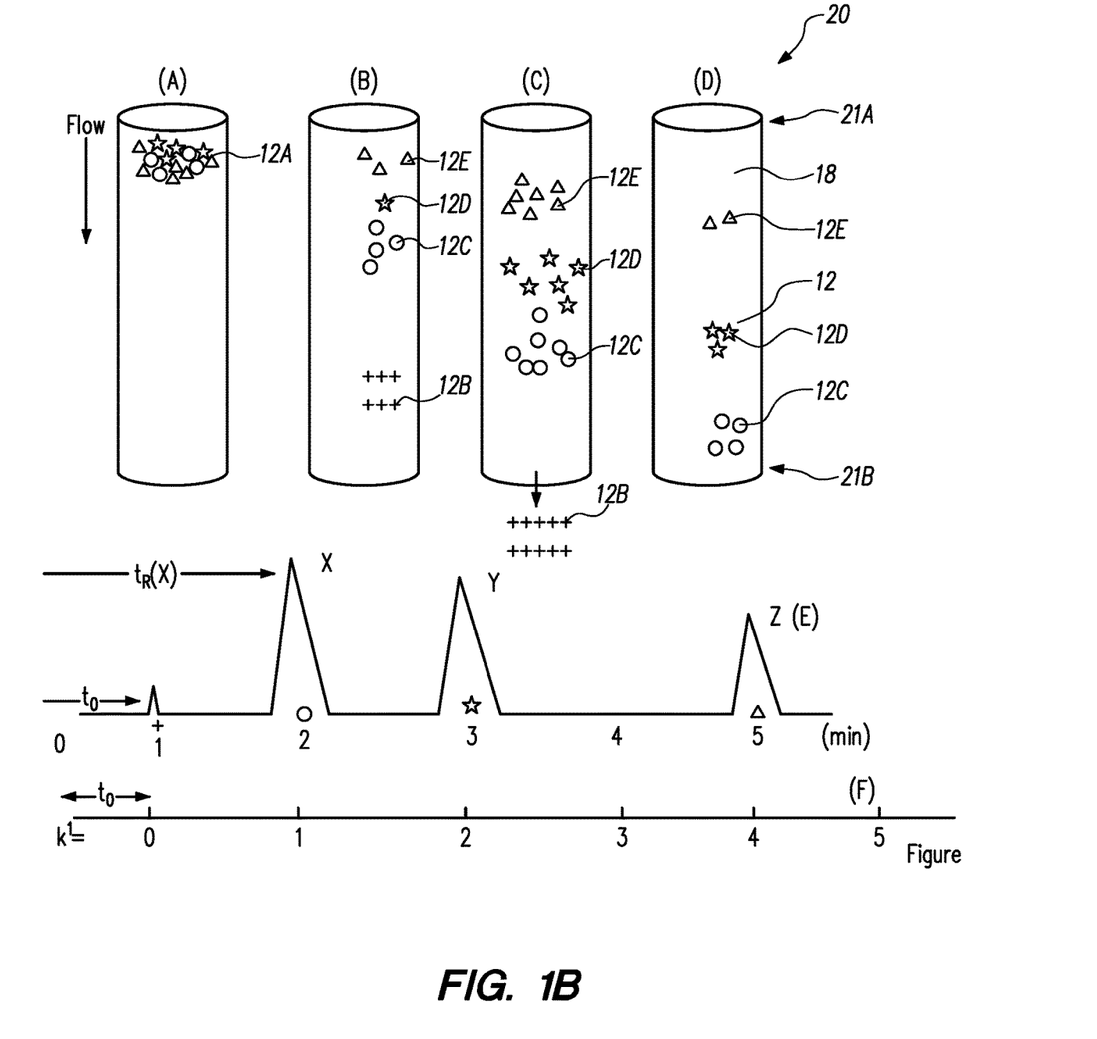
FIG. 1B illustrates a column of the liquid chromatography system of FIG. 1A at four different times.

FIG. 1B is a schematic illustration of the separation column 20 separating a mixture into different aliquots that then elute from the column 20 at different times. More specifically, moving left to right, FIG. 1B illustrates the separation column 20 at four different times labeled A, B, C, and D. As shown in FIG. 1B, the column 20 includes an inlet 21A and an outlet 21B. Further, the components 12A enter at the inlet 21A concurrently, and these separations elute from the separation column 20 from the outlet 21B at different times, resulting in time aliquots of different components of the sample 12 mixture moving at different times through the separation column 20. As a result thereof, the separations will subsequently be directed into a flow cell chamber 362 (illustrated in FIG. 3E) of the fluid analyzer 14 (illustrated in FIG. 1A) at different times. Stated in another fashion, a constant flow of solvent 18 through the column 20 moves these sample 12 aliquots along to the flow cell chamber 362 of the fluid analyzer 14 at different times for analysis at different times.

More specifically, in FIG. 1B, the first column (on the left) illustrates a plurality of different compounds 12A represented by plus sign, circle, star, and triangle, enter the separation column concurrently. Next, the second through four columns illustrate that the compounds have separated with the plus sign compound 12B exiting the column first, the circle compound 12C exiting next, the star compound 12D exiting next, and the triangle compound 12E exiting last.

The two axes at the bottom of FIG. 1B represent the time evolution of the eluting sample. The upper axis shows the retention time (tR) in the column with respect to the initial injection of the sample at time 0. As can be seen, each of the compounds exits the column at different retention times. The axis on the bottom shows the time each component exits from the column relative to the time for the first component (indicated by a '+' sign) to arrive. Time $t_0$ indicates the time from injection for the '+' component to arrive.

Referring back to FIG. 1A, the liquid chromatography and spectroscopy system 10 can include the control and analysis system 30 that controls one or more components of the system 10. For example, the control and analysis system 30 can control the operation of the fluid analyzer 14, the solvent supply 17, the injector assembly 25, the waste collection assembly 32, and the fraction collector assembly 34. Moreover, the control and analysis system 30 can analyze the data generated by the fluid analyzer 14 to characterize one or more components of the sample 12.

In certain embodiments, the control and analysis system 30 can include one or more processors and/or electronic data storage devices. It should be noted that the control and analysis system 30 is illustrated in FIG. 1A as a single, central processing system. Alternatively, the control and analysis system 30 can be a distributed processing system. Additionally, the control and analysis system 30 can include a display (e.g. LED display) that displays the test results.

The waste collection assembly 32 receives the waste from the injector valve 26. For example, the waste collection assembly 32 include one or more receptacles.

The fraction collector assembly 34 collects one or more of the fractions that have passed through the fluid analyzer 14. In one non-exclusive embodiment, the fraction collector assembly 34 includes a collector frame 34A that retains one or more collector receptacles 34B. In this embodiment, the collector frame 34A is disk shaped and can be rotated to position different collector receptacles for collecting the fractions that have passed through the fluid analyzer 14.

In the embodiment illustrated in FIG. 1A, (i) the fluid analyzer 14 can be considered the spectroscopy portion of the liquid chromatography and spectroscopy system 10; and (ii) the rest of the components other than the fluid analyzer 14 can be considered the liquid chromatography portion of the liquid chromatography and spectroscopy system 10. It should be noted that the fluid analyzer 14 provided herein can be used with a different system, e.g. a different liquid sample source (not shown) than the liquid chromatography portion illustrated in FIG. 1A.

It should be noted that the pump assembly 22 is connected in fluid communication to the solvent reservoirs 24 with a pair of reservoir conduits 24A, and the pump assembly 22 is connected in fluid communication to the mixer 23 with a pair of mixer conduits 23A. Further, the mixer 23 is connected in fluid communication to the injector assembly 25 with an injector conduit 25A. Moreover, the injector assembly 25 is connected in fluid communication with the column 20 with a connector conduit 20A. Further, the column 20 is connected in fluid communication with the fluid analyzer 14 with an inlet conduit 56. Additionally, the fluid analyzer 14 is connected in fluid communication with the fraction collector assembly 34 with an outlet conduit 58.

Figure 2:
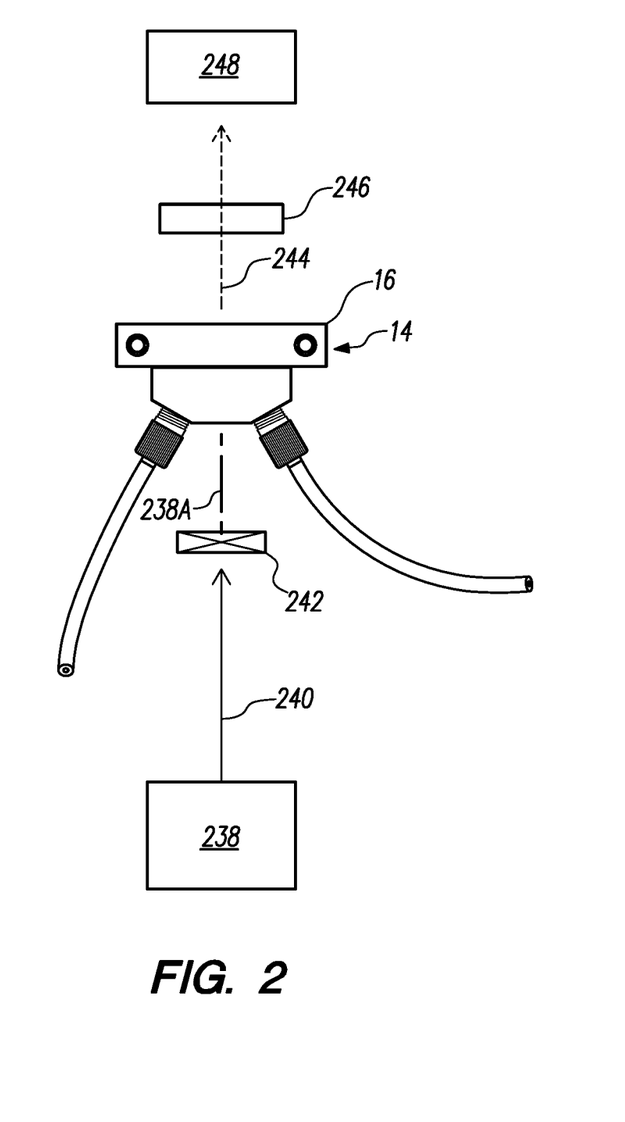
FIG. 2 is simplified illustration of a fluid analyzer of the spectroscopy system of FIG. 1A.

FIG. 2 is a simplified top view of the fluid analyzer 14 without the housing that retains and encloses the components of the fluid analyzer 14. In this example, the fluid analyzer 14 can be a laser spectrometer coupled to the liquid flow cell assembly 16 for the liquid sample. In FIG. 2, the fluid analyzer 14 includes a light source 238 that generates a focused light beam 240 (e.g. a laser beam) that passes through an illumination lens assembly 242 and is directed at the flowing sample 12 (not shown in FIG. 2) in the flow cell assembly 16. Subsequently, an output beam 244 exiting the flow cell assembly 16 is collected by and passes through an output lens assembly 246, and is directed at the optical detector assembly 248. The design and orientation of each of these components can be varied. For example, the flow cell assembly 16 can be flipped relative to the light source 238 and the optical detector assembly 248.

The light source 238 generates the light beam 240 that interrogates the flowing sample 12. In FIG. 2, the light source 238 directs the light beam 240 along a beam axis 238A through the flow cell assembly 16.

As a non-exclusive example, the light source 238 can be a tunable light source that directly generates and emits a substantially temporally coherent output beam 240. For example, the light source 232 can be an external cavity, Littrow configuration, tunable laser that generates a laser input light beam 240. In one specific example, the light source 238 is a tunable mid-infrared ("MIR") laser and the input light beam 240 has a center wavelength that is in the mid-infrared range. The term "MIR range" shall mean and include the spectral region or spectral band of between approximately five thousand to five hundred wavenumbers (5000-500 cm$^{-1}$), or approximately two and twenty micrometers (2-20 μm) in wavelength. In this embodiment, the laser 238 can be tuned to different center wavelengths over time to interrogate the sample 12 at different wavelengths. Alternatively, the light source 238 can be designed to generate the input light beam 240 having a center wavelength outside the mid-infrared range, e.g. another portion of the infrared range or in the visible or ultra-violet range.

As a non-exclusive example, the light source 232 can include a Quantum Cascade gain medium (not shown) and a wavelength selective feedback element (not shown) (e.g. a diffraction grating) that can be moved relative to the gain medium to select (tune) the center wavelength of the laser input light beam 240. With this design, the control and analysis system 30 (illustrated in FIG. 1A) can control the current to the gain medium and the position of the wavelength selective feedback element to control the center wavelength of the laser input light beam 240.

As provided herein, in certain embodiments, the input light beam 240 is focused and has a beam diameter that is less than 0.1 centimeters. This relatively small diameter of the input light beam 240 allows for the use of a relatively small sized flow cell chamber 362. Because the input light beam 240 is a laser beam, it can be easily controlled and focused on a relatively small flow cell chamber 362.

The design of the illumination lens assembly 242 and the output lens assembly 246 can be varied to suit the wavelength of the input light beam 240. For example, the illumination lens assembly 242 and/or the output lens assembly 246 can each include one or more lens made out materials that are operable in the mid-infrared range. For example, the illumination lens assembly 242 and/or the output lens assembly 246 can include one or more lenses made of germanium. However, other materials may also be utilized.

The design of the optical detector assembly 248 can be varied to suit the wavelength of the input light beam 240. As a non-exclusive example, the optical detector assembly 248 can include a thermoelectrically cooled, photoconductive, InAsSb (indium arsenide antimonide) detector. Alternatively, another type of optical detector assembly 248 can be utilized.

Figure 3A:
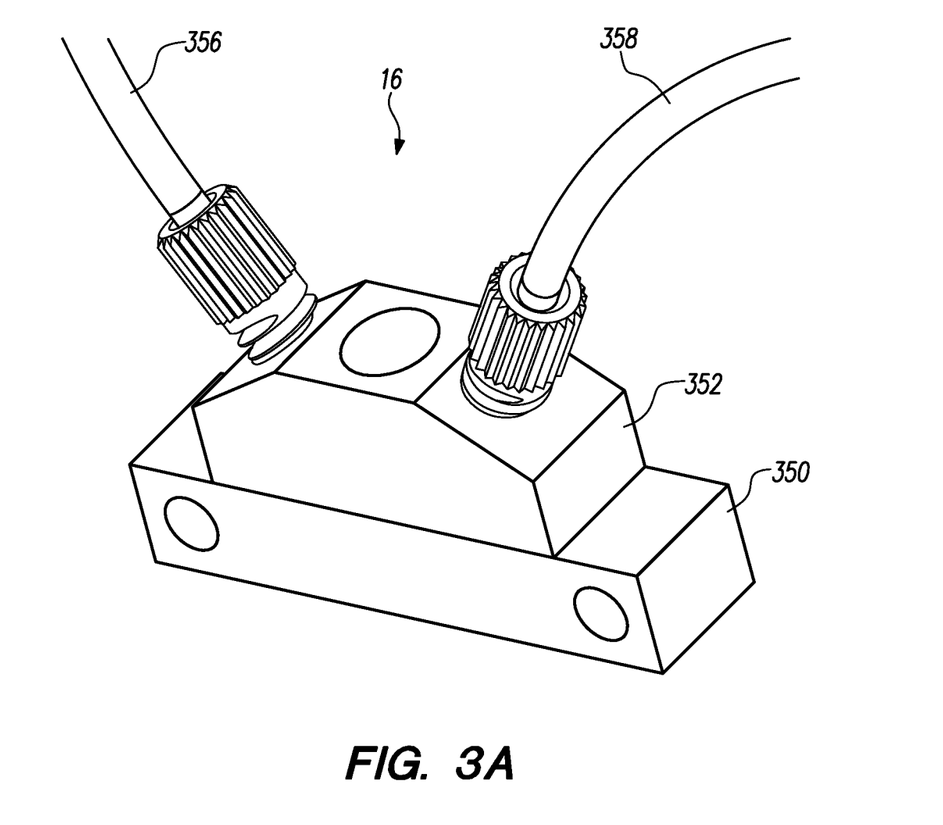
FIGS. 3A and 3B are alternative perspective views of a flow cell assembly from the fluid analyzer of FIG. 2.
Figure 3B:
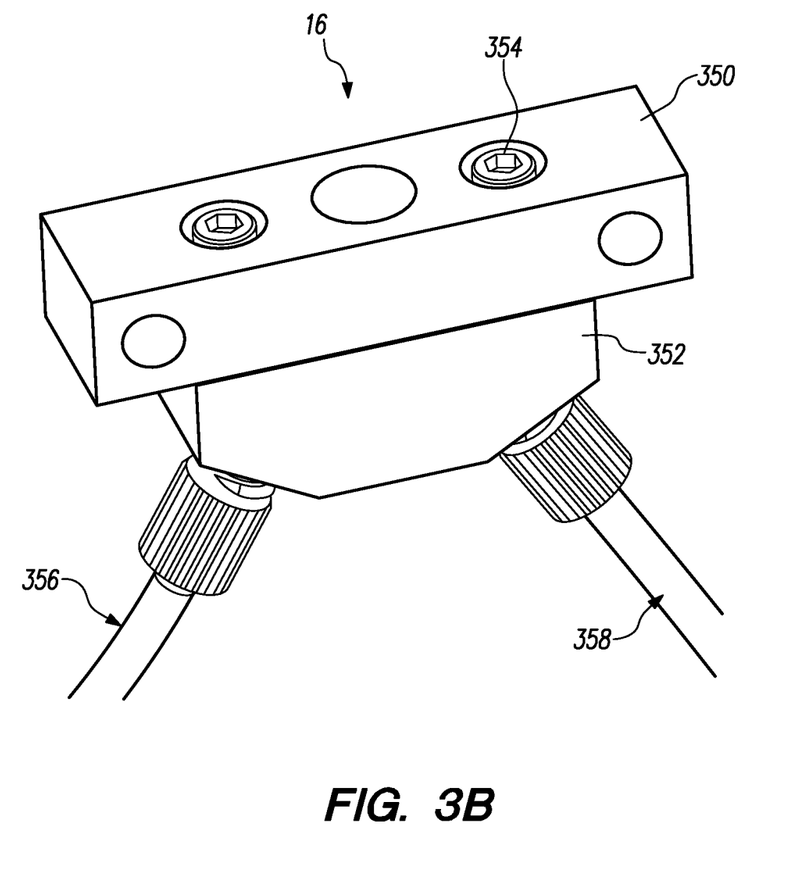

FIGS. 3A and 3B are alternative perspective views of a flow cell assembly 16 from the fluid analyzer 14 of FIG. 2. In this embodiment, a base 350, a cap 352, a fastener assembly 354, a portion of the inlet conduit 356, and a portion of the outlet conduit 358 of the flow cell assembly 16 are illustrated.

Figure 3C:
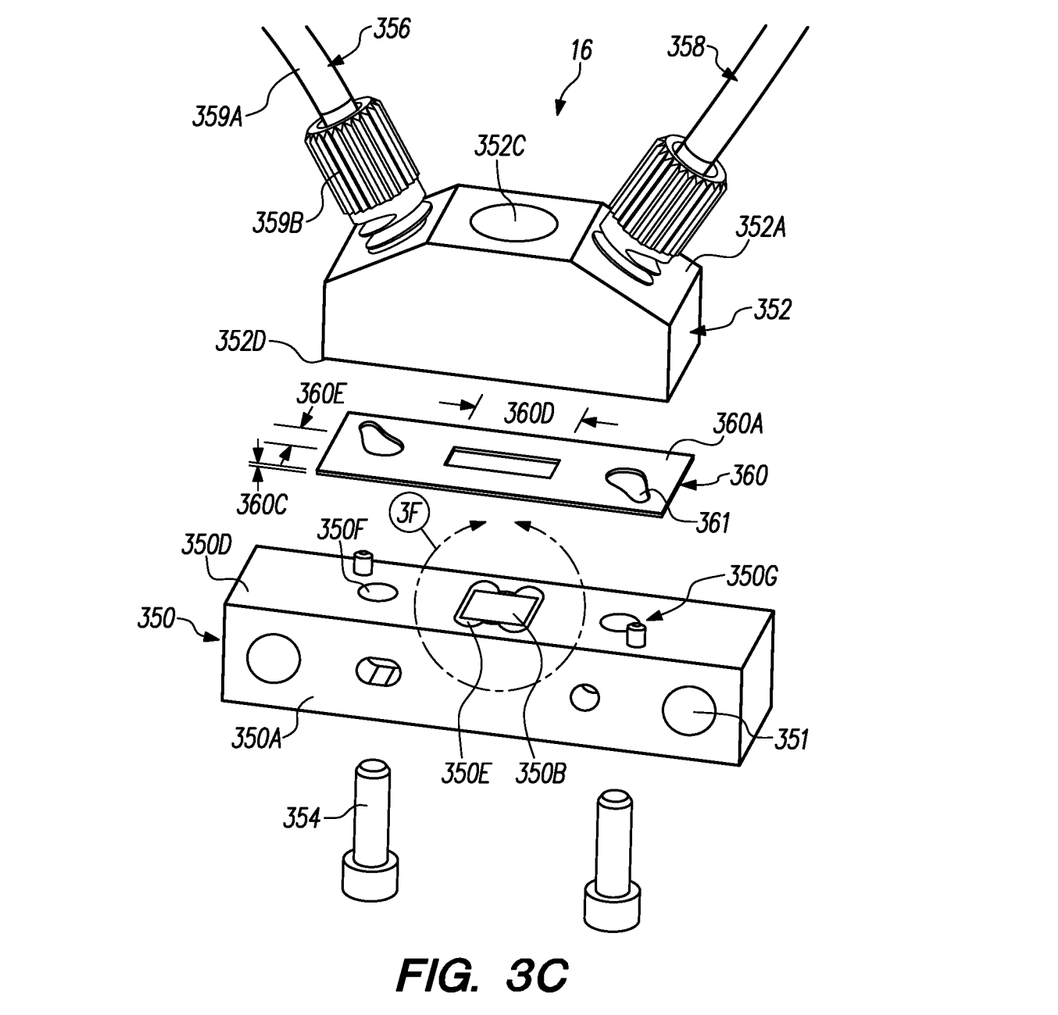
FIGS. 3C and 3D are alternative, exploded perspective views of the flow cell assembly.
Figure 3D:
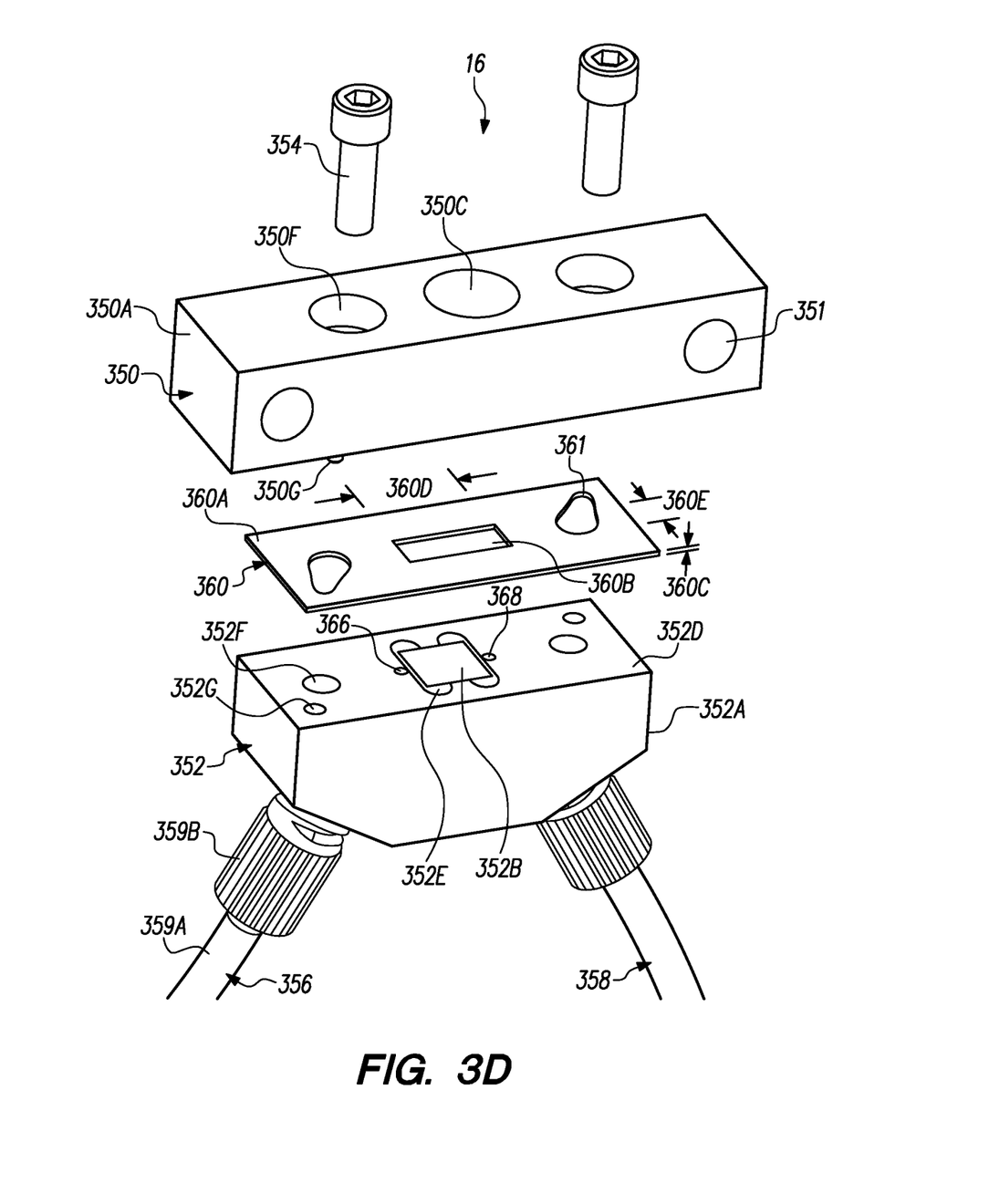
Figures 3E, 3H:
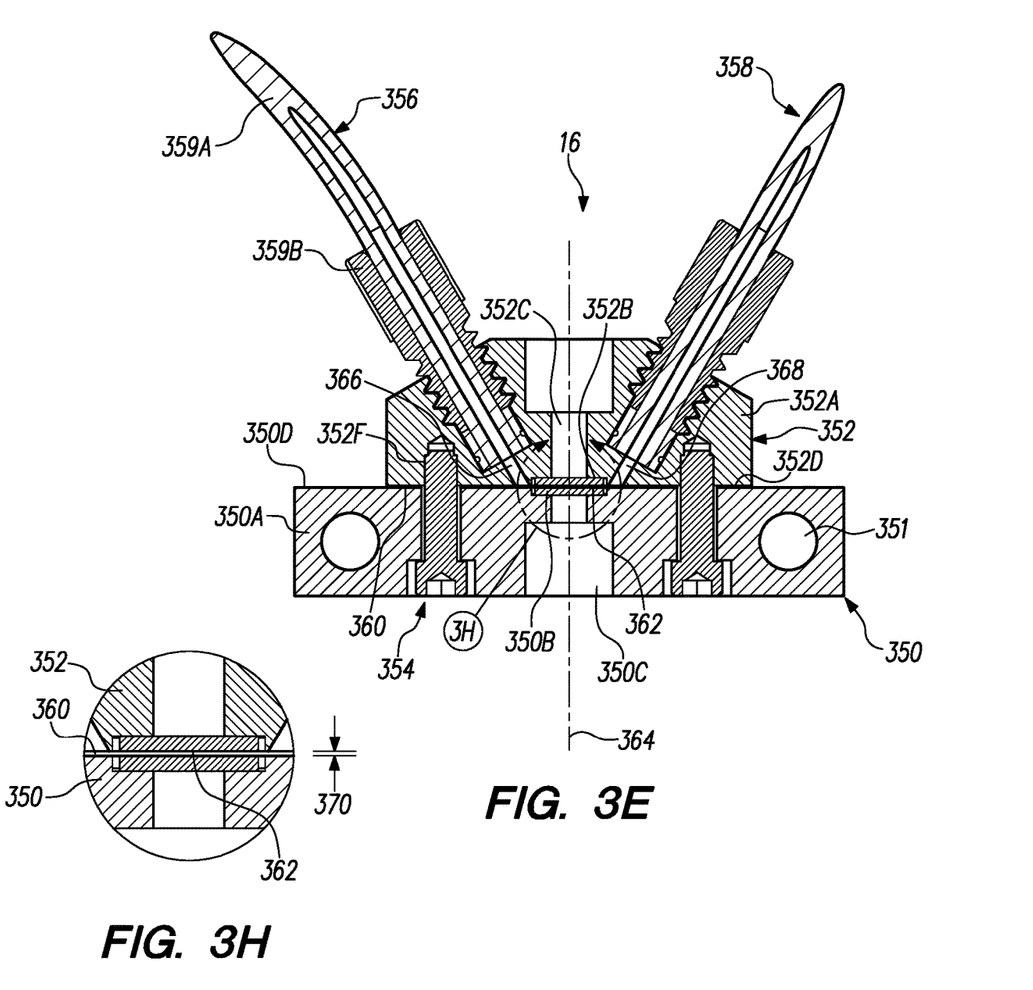
FIG. 3E is a cut-away view of the flow cell assembly.
FIG. 3H is an enlarged cut-away view of the cap, gasket and base taken from FIG. 3E.
Figure 3F:
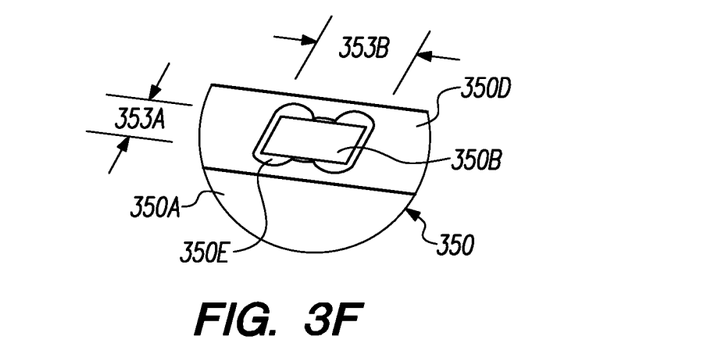
FIG. 3F is an enlarged cut-away view from FIG. 3C.

FIGS. 3C and 3D are alternative, exploded perspective views and FIG. 3E is a cut-away view of the flow cell assembly 16 of FIGS. 3A and 3B. Further, FIG. 3F is an enlarged cut-away view of the base 350 taken from FIG. 3C. In FIGS. 3C, 3D and 3E, a gasket 360 is also visible, in addition to the base 350, the cap 352, the fastener assembly 354, the portion of the inlet conduit 356, and the portion of the outlet conduit 358 of the flow cell assembly 16. In this embodiment, the gasket 360, the base 350, and the cap 352 cooperate to define a flow cell chamber 362 (illustrated in FIG. 3E). The size, shape and design of each of these components can be varied according to the teachings provided herein.

In the non-exclusive embodiment illustrated in these Figures, the base 350 includes a rigid, generally rectangular shaped base body 350A, a base window 350B that is secured to the base body 350A, and a base aperture 350C that extends through the base body 350A. In this embodiment, the base aperture 350C is aligned with the base window 350B along a window axis 364 that is substantially coaxial with the beam axis 238A (illustrated in FIG. 2). In this non-exclusive embodiment, the base aperture 350C is generally cylindrical shaped, and as illustrated in FIG. 3F, the base window 350B is generally rectangular shaped and positioned substantially flush with a base interface surface 350D of the base body 350A. For example, an adhesive 350E can be used to secure the base window 350B to the base body 350A. Alternatively, the base aperture 350C and the base window 350B can have another shape, and/or the base window 350B can be secured to the base body 350A in another fashion.

Additionally, the base body 350A can include one or more spaced apart, base fastener apertures 350F (two are illustrated) that extend through the base body 350A and that receive the fastener assembly 354. Moreover, the base body 350A can include one or more attachment apertures 351 (two are illustrated) that can be used to secure the flow cell assembly 16 to the rest of the fluid analyzer 14 (illustrated in FIG. 1A).

Moreover, the base body 350A can include an alignment assembly 350G, e.g. one or more alignment pins (two spaced apart pins are illustrated) that extend upward (in FIG. 3C) and are used to align the base 350, the cap 352 and the gasket 360. Alternatively, the alignment pins 350G can be fixedly secured to the cap 352.

In one, non-exclusive embodiment, the base body 350A is made of stainless steel or other suitable material.

Somewhat similarly, in the non-exclusive embodiment illustrated in these Figures, the cap 352 includes a rigid, cap body 352A, a cap window 352B that is secured to the cap body 352A, and a cap aperture 352C that extends through the cap body 352A. In this embodiment, the cap aperture 352C is aligned with the cap window 352B along the window axis 364 that is coaxial with the beam axis 238A (illustrated in FIG. 2). In this non-exclusive embodiment, the cap aperture 352C is generally cylindrical shaped, and the cap window 352B is generally rectangular shaped and positioned substantially flush with a cap interface surface 352D. For example, an adhesive 352E can be used to secure the cap window 352D to the cap body 352A. Alternatively, the cap aperture 352C and the cap window 352B can have another shape, and/or the base window 352B can be secured to the base body 352A in another fashion.

Additionally, the cap body 352A can include one or more cap fastener internally threaded apertures 352F (two are illustrated) that receive a portion of the fastener assembly 354 to secure the base 350 to the cap 352 with the gasket 360 therebetween.

Moreover, the cap body 352A can include one or more alignment pin apertures 352G (two are illustrated) that are sized and shaped to receive the alignment pins 350G of the base 350 to align the base 350, the cap 352 and the gasket 360.

In one embodiment, the cap body 352A is made of stainless steel or other suitable material.

Each window 350B, 352B can be made of AR coated diamond (or other suitable material) and is relatively small. Alternatively, for example, one or both windows 350B, 352B can be made from other mid-infrared transmissive materials, even polymers and plastics.

As a non-exclusive example, with reference to FIG. 3F, the base window 350B is square shaped and can have a window width 353A of approximately three millimeters, a window length 353B of approximately three millimeters, and a thickness of approximately 0.3 millimeters. The cap window 352B can be similarly designed. The diamond windows 350B, 352B are very durable. Alternatively, the size and shape of the windows 350B, 352B can be different than the example provided above.

With reference to FIG. 2 and FIGS. 3C, 3D, and 3E, in certain embodiments, the input light beam 240, and the output beam 244 are normal to the windows 350B, 352B. Further, the light beams 240, 244 can be coaxial with the window axis 364. With this design, the input light beam 240 can pass through the cap aperture 352C, the cap window 352B, the sample 12 in the flow cell chamber 362, the base window 350B, and the base aperture 350. Alternatively, for example, the orientation of the flow cell assembly 16 can be flipped.

The inlet conduit 356 delivers the sample 12 (illustrated in FIG. 1A) to the flow cell assembly 16, and the outlet conduit 358 allows for the sample 12 to exit the flow cell assembly 16. In one embodiment, the inlet conduit 356 and the outlet conduit 358 are in fluid communication with the cap 352 and extend through the cap 352. For example, each conduit 356, 358 can include a flexible fluid tube 359A that is secured to the cap 352 using a fitting 359B, e.g. a zero volume fitting, that is threaded directly into the cap 352. In one embodiment, inlet conduit 356 and the outlet conduit 358 are at an angle relative to the window axis 364 and the flow cell chamber 362. For example, the inlet conduit 356 and/or the outlet conduit 358 can be at an angle of between approximately 20 to 70 degrees relative to the window axis 364.

Further, in this embodiment, the cap 352 includes an inlet passageway 366 that extends through the cap 352 into the flow cell chamber 362 that allows the sample 12 to be directed into the flow cell chamber 362; and an outlet passageway 368 that extends through the cap 352 into the flow cell chamber 362 to allow the sample 12 to exit the flow cell chamber 362. Moreover, in one embodiment, the inlet passageway 366 and the outlet passageway 368 are at an angle relative to the window axis 364 and the flow cell chamber 362. For example, the inlet passageway 366 and/or the outlet passageway 368 can be at an angle of between approximately 20 to 70 degrees relative to the window axis 364.

In the embodiment illustrated in the Figures, the inlet conduit 356 is threaded into the cap 352 near the inlet passageway 366, and the outlet conduit 358 is threaded into the cap 352 near the outlet passageway 368. Alternatively, the inlet conduit 356, the outlet conduit 358, the inlet passageway 366 and the outlet passageway 368 can extend through the base 350. Still alternatively, the inlet conduit 356 and the inlet passageway 366 can extend through one of the base 350 and the cap 352; and the outlet conduit 358 and the outlet passageway 368 can extend through the other of the base 350 and the cap 352.

In one embodiment, (i) the inlet conduit 356 has an inlet conduit cross-sectional area; (ii) the outlet conduit 358 has an outlet conduit cross-sectional area; (iii) the inlet passageway 366 has an inlet passageway cross-sectional area; (iv) the outlet passageway 368 has an outlet passageway cross-sectional area; and (v) the flow cell chamber 362 has a chamber cross-sectional area. In one embodiment, the chamber cross-sectional area is approximately equal to one or more (e.g. all) of (i) the inlet conduit cross-sectional area; (ii) the outlet conduit cross-sectional area; (iii) the inlet passageway cross-sectional area; (iv) the outlet passageway cross-sectional area. In alternative, non-exclusive examples, the chamber cross-sectional area is within approximately 1, 2, 5, 10, 20, 25, 50, 75, 100, 200, or 500 percent, of one or more (e.g. all) of (i) the inlet conduit cross-sectional area; (ii) the outlet conduit cross-sectional area; (iii) the inlet passageway cross-sectional area; (iv) the outlet passageway cross-sectional area. This minimize dead volume and mixing of the sample 12 during the analysis in the flow cell chamber 362.

Stated in a different fashion, as alternative, non-exclusive examples, the flow cell chamber 362 can be generally rectangular shaped and can have a chamber cross-section area that is approximately 1, 2, 5, 10, 20, 25, 50, 75, 100, 200, or 500 percent of the inlet conduit cross-sectional area and the inlet passageway cross-sectional area. Further, as a non-exclusive examples, the flow cell chamber 362 can have a volume of less than 0.5, 1, 1.5, 2, 3, or 5 micro-liters. This results in a short sample cell length for the liquid to traverse during the analysis.

The gasket 360 is secured to and positioned between the base 350 and the cap 352. In one embodiment, the gasket 360 includes a gasket body 360A having a gasket opening 360B. Further, the gasket 360 can include one or more gasket apertures 361 (two are illustrated) that allow for the alignment pins 350G and the fasteners of the fastener assembly 354 to extend through gasket 360. In one embodiment, each gasket aperture 361 is somewhat tear-dropped shaped. Alternatively, each gasket aperture 361 can have a different configuration.

The gasket 360 can be made of a resilient material to form a seal between the base 350 and the cap 352, and seal between the windows 350B, 352B to define the flow cell chamber 362. Non-exclusive examples of suitable materials for the gasket 360 include Teflon (PTFE), rubber (Viton), metals (e.g. copper), or other plastic and rubber polymers.

With reference to FIGS. 3C and 3D, in one non-exclusive embodiment, the gasket body 360A is generally rectangular shaped, has a gasket thickness 360C, and the gasket opening 360B has an opening length 360D and an opening width 360E. As a non-exclusive example, the gasket opening 360B is rectangular shaped and has an opening length 360D of approximately 4.75 millimeters, and an opening width 360E of approximately 1.01 millimeters, and the gasket thickness 360C is approximately 0.15 millimeters. Alternatively, (i) one or more of the opening length 360D, opening width 360E, and gasket thickness 360C can be changed to change the volume of the flow cell chamber 362; (ii) one or more of the opening width 360E, and gasket thickness 360C can be changed to change the cross-sectional area of the flow cell chamber 362; and (iii) the gasket thickness 360C can be changed to change the path length 370 of the flow cell chamber 362. Thus, the gasket 360 can be designed to achieve the desired volume, cross-sectional area, and path length 370 of the flow cell chamber 362.

As non-exclusive embodiments, the gasket thickness 360C can be approximately 0.01, 0.025, 0.05, 0.075, 0.1, 0.125, 0.15, 0.2, 0.5, 1.0, 1.5, 2, 2.2, 2.4, 2.5, or 3 millimeters.

Figure 3G:
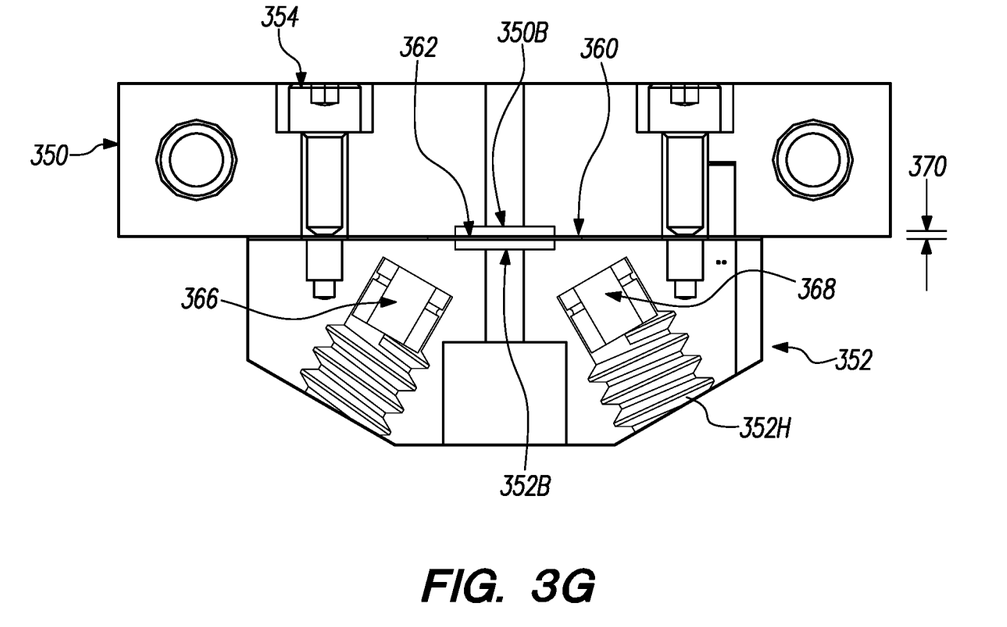
FIG. 3G is another cut-away view of the cap, gasket and base.

FIG. 3G is an enlarged cut-away view of the cap 352, the gasket 360, the base 350, and the fastener assembly 354. Additionally, FIG. 3G illustrates the inlet passageway 366, the outlet passageway 368, the base window 350B of the base 350, the cap window 352B of the cap 352, and the flow cell chamber 362. Moreover, FIG. 3G illustrates that the cap 352 can include a pair of internally threaded fitting apertures 352H for receiving the fittings 359B (illustrated in FIGS. 3C, 3D, and 3E).

FIG. 3H is an enlarged cut-away view of the cap 352, the gasket 360, and the base 350 taken from FIG. 3E. FIG. 3H also illustrates the flow cell chamber 362.

With reference to FIGS. 3C, 3D, 3E, 3G and 3H, as provided above, the gasket 360, the base 350, and the cap 352 cooperate to define the flow cell chamber 362. Further, the base window 350B and the cap window 352B define a portion the flow cell chamber 362, and are positioned on opposite sides of the flow cell chamber 362.

In certain embodiments, (i) the gasket 360 allows fluid to pass between windows 350B, 352B without leaking out; (ii) the gasket thickness 360C sets the absorption path length 370 (referenced in FIGS. 3G and 3H) of the beam that travels through the flow cell chamber 362 and the sample 12, and the corresponding distance between the windows 350B, 350C; and (iii) the fluid path along gasket plane is minimized to reduce dead fluid volume.

Stated in another fashion, in certain embodiments, a path length 370 of the illumination beam through the flow cell chamber 362 between the windows 350B, 352B is defined by the gasket thickness 360C. Alternative, non-exclusive embodiments, the path length 370 can be approximately 0.01, 0.025, 0.05, 0.075, 0.1, 0.125, 0.15, 0.2, 0.5, 1.0, 1.5, 2, 2.2, 2.4, 2.5, or 3 millimeters. With this design, the gasket thickness 360C can be changed to change the path length 370. It should be noted that in certain embodiments, the gasket 360 is slightly compressible. With this design the amount of torque applied to the fastener assembly 354 can also influence the final path length 370. In this design, the fastener assembly 354 is tightened so that the path length 370 is within approximately 1, 5, 10, or 25 percent of the gasket thickness 360C.

Further, the size and shape of the gasket opening 360B of the gasket 360 can be changed to adjust the cell cross-sectional area of the flow cell chamber 362, and a volume of the flow cell chamber 362.

The fastener assembly 354 selectively attaches the cap 352 to the base 350 with the gasket 360 therebetween and with the windows 350B, 352B aligned along the window axis 364 and spaced apart the path length 370 through the flow cell chamber 362. In one embodiment, fastener assembly 354 includes a pair of threaded bolts. However, other types of fasteners can be utilized.

In certain embodiments, as provided herein, the flow cell assembly 16 provides a well-defined flow cell chamber 362 having an inlet passageway 366 and an outlet passageway 368 for the liquid that lead to a well-defined sampling area for probing with an infrared beam.

The flow cell chamber 362 provided herein has one or more of the following characteristics: (i) small apertures 350C, 352C to couple with the focused input light beam 240; (ii) flow cell cross sectional area similar to the inlet conduit cross sectional area to minimize dead volume and mixing; and/or (iii) short sample cell length of the flow cell chamber 362 for the fluid to traverse. This minimizes transit time while not in tubing thus reducing mixing and delay broadening. The cell size of the flow cell chamber 362 has a small size and thermal mass. This allows easier mounting and thermal control. The diamond windows 350B, 352B can be used for their durability and strength. The smaller size of the windows 350B, 352B makes this economical.

Figure 4:
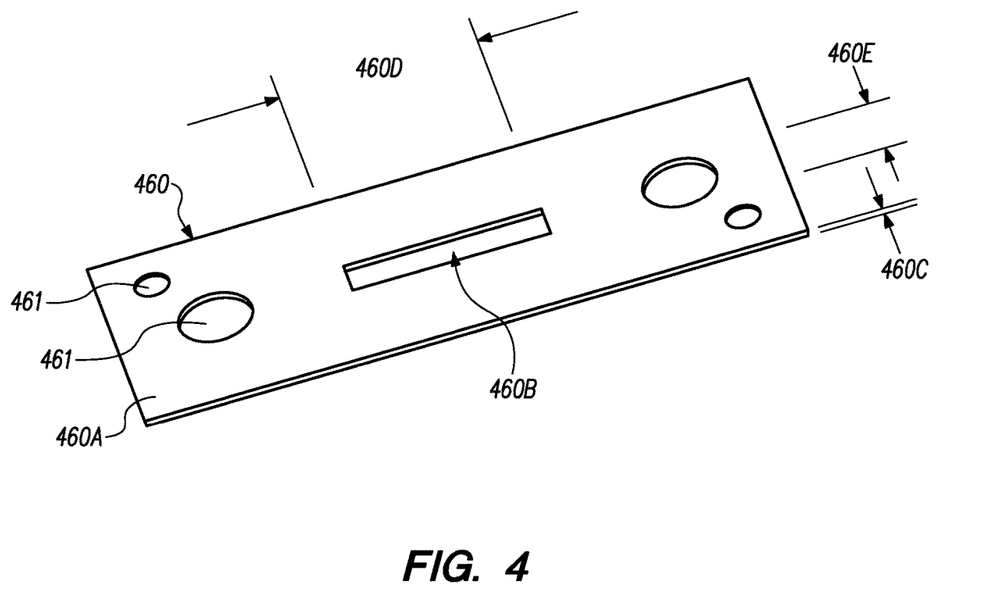
FIG. 4 is a perspective view of a gasket of the flow cell assembly.

FIG. 4 is a perspective view of another embodiment of a gasket 460 having features of the present invention. In this embodiment, the gasket 460 is similar to the corresponding gasket 360 described above, and includes a gasket body 460A having a gasket opening 460B, and gasket apertures 461. However, in this embodiment, instead of just two, tear dropped gasket apertures 461, the gasket 460 includes four gasket apertures 461, namely two for the alignment pins (not shown in FIG. 4) and two for the fasteners (not shown in FIG. 4).

Additionally, the gasket opening 460B has a gasket thickness 460C, an opening length 460D, and opening width 460E. In this embodiment, for the gasket 460 illustrated in FIG. 4, one or more of the gasket thickness 460C, the opening length 460D, and/or the opening width 460E can be different from the gasket 360 described above to change the size (volume) of the flow cell chamber, the cross-sectional area of the flow cell chamber, and/or the path length 370.

It should be noted that other changes to the flow cell assembly 16 are possible. For example, in certain embodiments, the flow cell assembly 16 is designed so that the path length 370 of the flow cell chamber 362 is selectively, and controllably adjustable over time. The goal is to obtain high quality spectrum of the main solvent in the flow cell chamber 362. For example, for water path lengths longer than ten micrometers, the absorption is so high that it is difficult to record a spectrum versus the empty flow cell. Plus, the empty flow cell is hard to achieve (completely clear of solvent, dry windows, and strong etaloning present with no liquid between the windows). However, recording a background with a long path length, then modulating the length by a few micrometers around this allows for high-quality solvent spectrum to be recorded without drying out the flow cell.

Moreover, some solvent spectral regions have much higher absorptions than others. For example, for water, it is possible to obtain high quality data with a 100 micrometer path length 370 from an input light beam having a center wavelength of 6.2 to 10.0 micrometers. However, for an input light beam having a center wavelength of between 5.9 and 6.2 micrometers, there is a very strong water absorption, and the path length 370 of the flow cell needs to be shortened to 25 micrometers to get data. Thus, as provided herein, in certain embodiments, the path length 370 of the flow cell can be modulated (e.g. by tens of micrometers) in real time to first allow a scan at the longer path length 370, then allow a scan at the shorter path length 370. In this way, the complete spectrum can be complied together for the whole spectral range including high absorption spectral regions.

In one non-exclusive embodiment, the flow cell assembly 16 can include a mechanism (e.g. an actuator) that can be controlled to selectively move the base and/or the cap to selectively expand and contract the gasket and adjust the path length 370 over the 1 to 50 micron distance range. This can be done in real time, for example, by changing the path length 370 twice a second. The mechanism could include one or more piezoelectric elements (or other actuators), for example, and that causes relative movement between the base and the cap to compress and/or allow for re-expansion of the gasket to change the path length 370. For example, the piezo-electric elements can selectively rotate the fasteners to selectively change the path length 370. Stated in another fashion, piezo-electric actuation of a leadscrew the controls the path length 370 is possible. Alternatively, for example, a direct push/pull piezo-electric actuator can be used to control the path length 370.

Additionally, in certain embodiments, the interior walls of one or both of the windows 350B, 352B can be coated. In one embodiment, the exterior side (air/glass interface) of the windows 350B, 352B can be coated with an anti-reflection coating. This can be important for diamond to air, since diamond has a relatively high refraction index of about 2.4 in the mid-infrared range. However, the index of refraction of water in the mid-infrared range is about 1.3, so there is still significant reflection loss at the liquid/diamond interface. As provided herein, the interior surface (interior liquid interface) of each window 350B, 352B can also be coated with an anti-reflection coating to reduce this loss, allow more power transmission of the input light beam and reduce etaloning effects.

Moreover, one or both of the windows 350B, 352B can have a different geometry than illustrated herein. For example, the flow cell assembly 16 can be designed so that there is not a direct path of the laser beam through the flow cell chamber 362. For example, one or both of the windows 350B, 352B could actually be prisms or other geometric forms with total internal reflection that allow routing the light around for different paths through the flow cell. This would allow for longer paths in the window glass, thus producing etaloning fringes with smaller frequency spacing that can be averaged over.

While the particular systems as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A cell assembly for a fluid analyzer that analyzes a sample, the cell assembly comprising:
   a base that includes a base window, the base defining at least a portion of a cell chamber having a path length of less than or equal to three millimeters; and
   an inlet passageway into the cell chamber that allows the sample to flow into the cell chamber; wherein the inlet passageway has an inlet cross-sectional area measured orthogonal to flow in the inlet passageway; wherein the cell chamber has a cell cross-sectional area measured orthogonal to flow in the cell chamber; wherein the cell cross-sectional area is constant along the cell chamber; and wherein the cell cross-sectional area is within two percent of the inlet cross-sectional area of the inlet passageway.

2. The cell assembly of claim 1 further comprising an outlet passageway into the cell chamber that allows the sample to exit the cell chamber; wherein an outlet cross-sectional area measured orthogonal to flow of the outlet passageway is within two percent of the cell cross-sectional area.

3. The cell assembly of claim 2 further comprising a cap that is coupled to the base, and a gasket that is coupled to and positioned between the base and the cap; wherein the cap includes a cap window and the inlet passageway extends through at least one of the base and the cap; wherein the outlet passageway extends through at least one of the base and the cap.

4. The cell assembly of claim 3 and wherein the windows are spaced apart along a window axis; and wherein at least one of the passageways is at an angle of less than seventy degrees relative to the window axis.

5. The cell assembly of claim 4 wherein the base includes a base aperture that is aligned with the base window, and the cap includes a cap aperture that is aligned with the cap window; and wherein the base window, the base aperture, the cap window, and the cap aperture are aligned along the window axis.

6. The cell assembly of claim 3 wherein a gasket thickness of the gasket defines the path length of the cell chamber.

7. The cell assembly of claim 1 wherein the cell chamber has a volume of less than one micro-liter.

8. The cell assembly of claim 1 wherein the cell chamber has a rectangular shape.

9. A fluid analyzer that comprises the cell assembly of claim 1, a light source that directs an input light beam into the base window into the sample in the cell chamber, wherein the light source is a tunable laser that is tuned to different center wavelengths over time while the sample is in the cell chamber.

10. A system that comprises the fluid analyzer of claim 9 and a pump assembly that moves the sample through the cell chamber; wherein the light source is tuned to different center wavelengths while the sample is flowing through the cell chamber.

11. A fluid analyzer for analyzing a sample, the fluid analyzer comprising:
a cell assembly having (i) a base that includes a base window; (ii) a cap that is secured to the base, the cap includes a cap window that is spaced apart from the base window; (iii) a gasket that is secured to and positioned between the base and the cap, the gasket including a gasket body that includes a gasket opening; wherein the gasket body, the base and the cap cooperate to define a cell chamber; and (iv) an inlet passageway into the cell chamber that allows the sample to flow into the cell chamber; wherein the cell chamber has a path length between the windows; wherein the path length is equal to a gasket thickness of the gasket; wherein the path length is less than or equal to three millimeters; and wherein the cell chamber has a cell cross-sectional area measured orthogonal to flow in the cell chamber; wherein the inlet passageway has an inlet cross-sectional area measured orthogonal to flow in the inlet passageway wherein the cell cross-sectional area is constant along the cell chamber; and wherein the cell cross-sectional area is within two percent of the inlet cross-sectional area of the inlet passageway;
a light source that directs an input light beam through one of the windows into the sample in the cell chamber, wherein the light source is a tunable mid-infrared laser that is tuned to different center wavelengths in the mid-infrared range over time while the sample is in the cell chamber; wherein the input light beam is normal to the windows; and
an optical detector assembly that receives the beam that passes through the sample.

12. The fluid analyzer of claim 11 wherein the cell chamber has a volume of less than one micro-liter.

13. The fluid analyzer of claim 11 wherein the cell chamber includes an outlet passageway into the cell chamber that allows the sample to exit the cell chamber; wherein an outlet cross-sectional area measured orthogonal to flow of the outlet passageway is within two percent of the cell cross-sectional area.

14. The fluid analyzer of claim 13 wherein the windows are spaced apart along a window axis; and wherein at least one of the passageways is at an angle of less than seventy degrees relative to window axis.

15. The cell assembly of claim 11 wherein the gasket opening is rectangular shaped and the cell chamber has a rectangular shape.

16. A method for analyzing a sample, the method comprising:
providing a base that includes a base window; the base defining at least a portion of cell chamber having a path length of less than or equal to three millimeters; and
directing the sample into the cell chamber through an inlet passageway; wherein the inlet passageway has an inlet cross-sectional area measured orthogonal to flow in the inlet passageway; wherein the cell chamber has a cell cross-sectional area measured orthogonal to flow in the cell chamber; wherein the cell cross-sectional area is constant along the cell chamber; and wherein the cell cross-sectional area that is within two percent of the inlet cross-sectional area of the inlet passageway.

17. The method of claim 16 further comprising directing an input light beam from a light source through the base window into the sample in the cell chamber, and collecting the beam that passes through the sample with an optical detector assembly, wherein the light source is a tunable mid-infrared laser that is tuned to different center wavelengths over time while the sample is in the cell chamber; wherein the input light beam is normal to the windows.

18. The method of claim 16 further comprising providing a cap that includes a cap window that is spaced apart from the base window; securing the base to the cap with a gasket therebetween; wherein the windows are spaced apart along a window axis; and wherein the step of directing includes the inlet passageway being an angle of less than seventy degrees relative to window axis.

19. The method of claim 18 further comprising removing the sample from the cell chamber through an outlet passageway to the cell chamber; wherein an outlet cross-sectional area measured orthogonal to flow of the outlet passageway is within two percent of the cell cross-sectional area.

20. The method of claim 16 wherein the cell chamber has a volume of less than one micro-liter.

* * * * *